(No Model.)
J. W. GERL.
BABY WALKER.
No. 554,179. Patented Feb. 4, 1896.
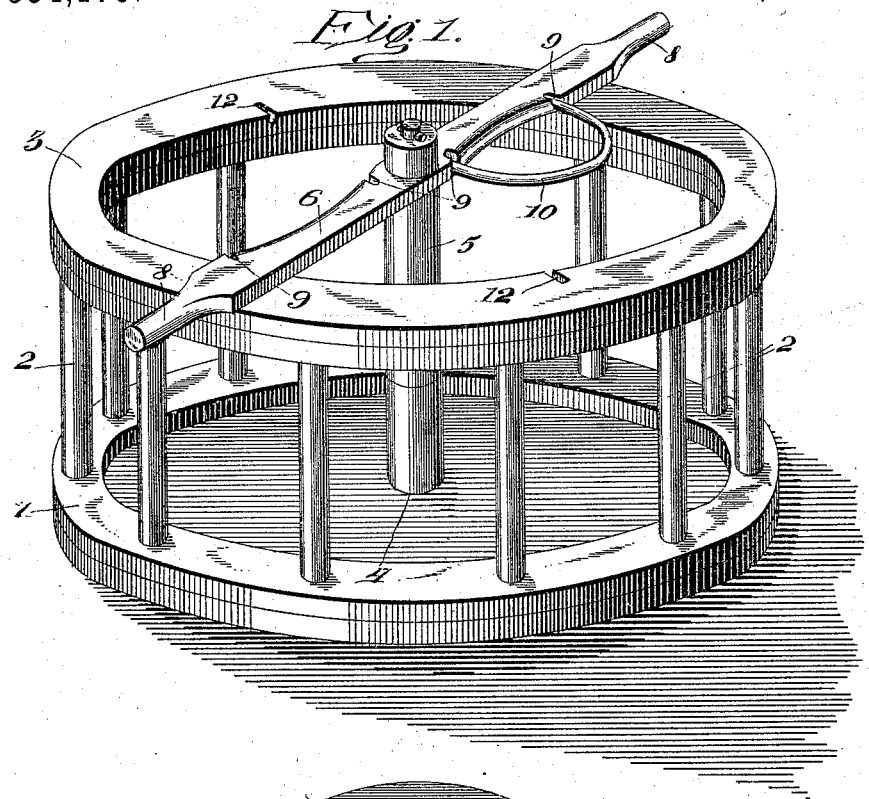
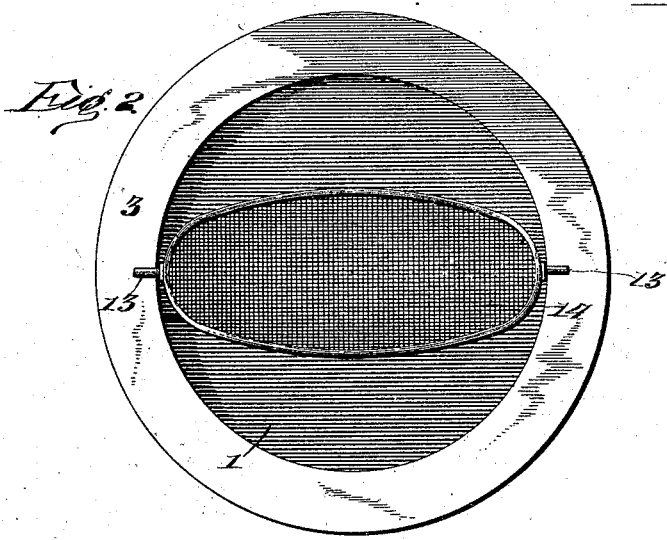
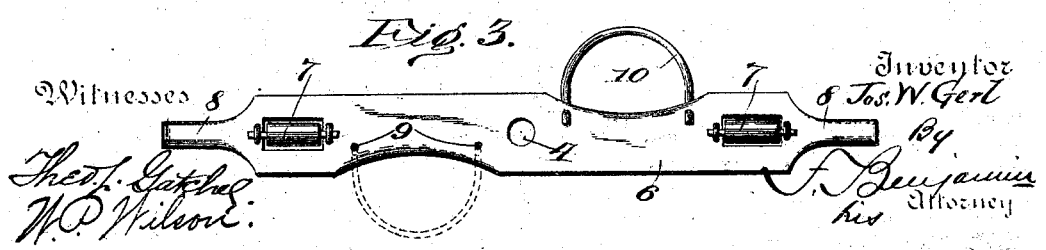
Witnesses
Thos. L. Gatchel
W. P. Wilson
Inventor
Jos. W. Gerl
By
F. Benjamin
his Attorney

UNITED STATES PATENT OFFICE.

JOSEPH W. GERL, OF HEWITT, WISCONSIN.

BABY-WALKER.

SPECIFICATION forming part of Letters Patent No. 554,179, dated February 4, 1896.

Application filed September 7, 1895. Serial No. 561,846. (No model.)

*To all whom it may concern:*

Be it known that I, JOSEPH W. GERL, a citizen of the United States, residing at Hewitt, in the county of Wood and State of Wisconsin, have invented certain new and useful Improvements in a Combined Baby-Walker and Cradle; and I do hereby declare the following to be a full, clear, and exact description of the invention, such as will enable others skilled in the art to which it appertains to make and use the same.

My invention relates to improvements in combined baby-walkers and cradles, the object of the same being to provide a simple and cheap device of this character by means of which young babies may be taught to walk, being supported by the shoulders, thereby preventing too great weight coming upon the legs, and also means by which the walker may be converted into a cradle for the child.

The invention consists of a cage made up of a solid circular base having uprights rising therefrom connected at their upper ends by a hollow circular top. The center of the base is perforated and through this passes one end of a rod or shaft, which has connected to it at a point near its upper end a horizontal bar extending across the top of the cage, having antifrictional rollers on its under side and provided with means for holding the baby. The top of the cage referred to is provided with two notches at diametrically-opposite points, in which fit rods projecting outwardly from the ends of a cradle, by means of which said cradle may be readily connected to the cage and supported thereby.

The invention is clearly illustrated in the accompanying drawings, in which—

Figure 1 represents a perspective view of my device used as a baby-walker. Fig. 2 is a plan view of the same with the cradle applied thereto. Fig. 3 is a bottom plan view of the transverse supporting-bar.

Like reference-numerals indicate like parts in the various views.

The cage is made up of a circular base 1, uprights 2 rising therefrom, and an annular top 3 supported upon the upper ends of said uprights. This cage may be made of any suitable material, preferably wood. The center of the base 1 is perforated, as shown at 4, and in this perforation fits the lower end of a central shaft 5 having secured at a point near its upper end a transverse bar 6 resting upon the top 3 of the cage and provided with antifrictional rollers 7 on its under surface and with handles 8 at its outer ends. At points on one or both sides of the central shaft 5 the transverse bar 6 is slotted, as shown at 9, and in these slots fit U-shaped wires 10, which are readily detachable and employed for the purpose of supporting the baby. The shaft 5 referred to is made up of two parts fitted to one another, by means of which the upper end of said shaft 5 carrying the arms 6 may be detached. The top 3 is provided with notches or recesses 12 12 at diametrically-opposite points, and in these notches 12 fit the rods or projections 13 extending outwardly from the ends of the cradle 14.

The operation of my device as a baby-walker is as follows: The two parts of the shaft 5 are connected, as shown in Fig. 1, and the baby is inserted between the loop 10 and the transverse bar 6. In this position he is supported by said wire and bar and may be led around within the cage by turning the bar 6 by its handles 8, or, if able to do so, propel himself independent of outside help.

When it is desired to use the device as a cradle, the two parts of the shaft 5 are separated, the upper part bearing the transverse bar 6 being entirely removed from the cage. The cradle 14 is now inserted in place, the rods 13 thereon fitting the notches or recesses 12 in the top 3 of the cage.

The invention is very simple in construction and it is thought to be extremely useful for the purpose for which it is designed.

Having now described my invention, what I claim as new, and desire to secure by Letters Patent, is—

1. In a baby-walker, the combination with a cage made up of a circular base, uprights rising therefrom, and an annular top supported by said uprights, of a central shaft made in two parts, rotatably mounted centrally of said cage, a transverse bar secured to the upper part of said shaft, having antifrictional rollers on its under side adjacent to the annular top of said cage, handles at its outer ends, and detachable loops for supporting a baby, substantially as and for the purpose described.

2. In a baby-walker, the combination with a cage made up of a circular base, uprights rising therefrom, and an annular top supported by said uprights, of a central shaft made in two parts, rotatably mounted centrally of said cage, a transverse bar secured to the upper part of said shaft, having antifrictional rollers on its under side adjacent to the annular top of said cage, handles at its outer ends, and detachable loops for supporting a baby, the said top being provided with notches in its upper face at diametrically-opposite points, substantially as and for the purpose described.

In testimony whereof I have signed this specification in the presence of two subscribing witnesses.

JOSEPH W. GERL.

Witnesses:
 JOSEF ANDEWEKER,
 NIC. LUDWIG.